3,138,570
VINYL RESIN SOLUTIONS STABILIZED BY A POLYMERIC ORGANOPHOSPHORUS COMPOUND
George W. Fowler, South Charleston, and Solomon P. Hersh and Andrew T. Walter, Charleston, W. Va., assignors to Union Carbide Corporation, a corporation of New York
No Drawing. Filed Nov. 21, 1960, Ser. No. 70,415
6 Claims. (Cl. 260—45.7)

The present invention relates to solutions of halogen-containing vinyl resins, and more particularly, to the production of stabilized solutions of halogen-containing vinyl resins which demonstrate an improved resistance to the development of color upon heating.

Halogen-containing vinyl resins are well known to the art and find use in a number of diverse applications. Noteworthy among these uses is the role such resins play in the production of synthetic fibers. It is also known that compositions prepared from halogen-containing vinyl resins are sensitive to heat and light as manifested by discoloration. Thus, for example, in the conventional production or spinning of shaped articles such as fibers from halogen-containing vinyl resins, it is usually necessary to dissolve the resin in a suitable organic solvent by means of heat and to maintain the solution at an elevated temperature for a prolonged period of time, during which the heated resin solution is extruded into either heated air or into a heated liquid coagulating bath. Unfortunately during these and/or other operations involving the heating of halogen-containing vinyl resin solutions, the color of the resin solution generally undergoes a progressive yellowing or darkening, which in turn, undesirably affects the color of the articles ultimately produced therefrom. Since a high degree of initial "whiteness" is generally desired for synthetic fibers, and since the initial color of the fibers is dependent in no small part upon the color of the resin solutions from which they are spun, the color developed as a consequence of heating may be sufficient to restrict many potential uses for the products. Consequently, it is customary to incorporate small amounts of stabilizing materials in halogen-containing vinyl resin solutions for the purpose of retarding or inhibiting discoloration.

Heretofore, a considerable number of compounds designed to function as stabilizers for halogen-containing vinyl resins have been proposed, as for instance, lead and calcium salts of the higher fatty acids, the alcoholates of alkaline earth metals, various organophosphites such as mono- and dialkyl phosphites, tri-(2-chloroethyl) phosphite, di- and triaryl phosphites, etc., various organotin compounds, such as dioctyltin maleate, dibutyltin dilaurate, etc., and the like. However, many of these compounds have not been found entirely satisfactory in minimizing the discoloration of halogen-containing vinyl resin compositions upon prolonged exposure to heat. Moreover, it has been found that the suggested use of many of the aforementioned compounds as stabilizers for halogen-containing vinyl resins when in a solid environment, e.g., milled sheets, fibers and the like, fails to predict their similar effectiveness when the resin is in solution.

Through the practice of the present invention, one or more of the following objects can now be achieved, thus overcoming many disadvantages of the prior art as hereinabove described.

It is an object of this invention to provide halogen-containing vinyl resin solutions which show improved resistance to discoloration upon exposure to heat. It is another object of this invention to provide improved stabilizing materials for increasing the resistance of halogen-containing vinyl resin solutions to discoloration upon exposure to heat. A further object of this invention is to provide a novel method for retarding or inhibiting the discoloration of halogen-containing vinyl resin solutions upon exposure to heat. Still other objects of this invention will become apparent in light of the following description.

The present invention is concerned broadly with the stabilization of solutions of those halogen-containing vinyl resins of the type prepared by the conjoint polymerization of vinyl chloride or vinylidene chloride, or both, with acrylonitrile. Within the broad class of these resins, conjointly polymerized vinyl chloride or vinylidene chloride, or both, with acrylonitrile, containing in the resin from about 15 percent to about 70 percent by weight of the polymerized chlorine-containing monomer have been found especially susceptible to stabilization by the materials hereinafter described. More particularly, the resin solutions contemplated by this invention are those in which the resin is dissolved in a suitable inert organic solvent, such as acetonitrile, acetone, the N,N-dialkylformamides and acetamides, ethylene carbonate, cyclohexanone, etc., or any other inert organic solvent for the resin which will not react with the stabilizer employed or the resin itself. Such solutions, for example, include those which currently find common usage as spinning "dopes" in the production of synthetic fibers, although, it is to be noted, this invention is in no way limited thereto.

The present invention is based upon the discovery that certain polymeric organophosphorus compounds serve as especially efficient heat stabilizers for solutions of halogen-containing vinyl resins. In particular, the polymeric organophosphorus compounds contemplated as stabilizers by this invention are the polymeric products produced by the reaction of a saturated aliphatic polyol containing from 2 to about 8 carbon atoms, especially a saturated aliphatic diol, with an aromtic dichlorophosphine, viz. either phenyldichlorophosphine:

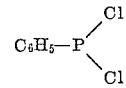

or phenoxydichlorophosphine:

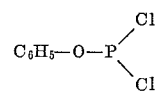

at a temperature of from about —10° C. to about 100° C., and preferably, at a temperature of from about 0° C. to about 50° C. During the course of the reaction, hydrogen chloride is also produced as a by-product, and is ordinarily and preferably removed from contact with both the reactants and the polymeric organophosphorus product as rapidly as it is formed.

The actual identity of the polymeric products produced as herein described will depend for the most part upon the ratio in which the reactants are employed. Thus, for example, upon the utilization of the phosphine reactant in a substantial excess over an equimolar proportion with respect to the preferred polyol reactant, i.e., a saturated aliphatic diol, especially in proportions greater than 2 up to about 4 or more moles of the phosphine per mole of the diol, the polymeric product obtained is predominantly the dimer having a structure corresponding to the general formula:

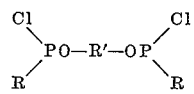

wherein R designates either a phenyl or phenoxy radical depending upon whether a phenyldichlorophosphine or phenoxydichlorophosphine reactant is employed, and R' designates a divalent radical residue derived from the diol reactant and which is otherwise identical in structure therewith save for the exclusion of hte hydroxyl radicals of the diol. Such a product, it can be seen, is produced by a reaction involving only one of the chlorine atoms of each molecule of the phosphine reactant and entails the evolution of hydrogen chloride. Alternatively, when the reactants are employed in more nearly equimolar proportions, e.g., in a proportion of less than about 2 moles of the phosphine per mole of the diol, or when the diol is utilized in an excess over an equimolar proportion with respect to the phosphine, the predominant product thus obtained is the more viscous liquid linear polymer having a structure corresponding to the general formula:

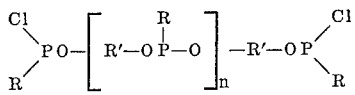

wherein R and R' are as defined above and $n$ represents an integer having a value of from 1 to about 8 or even higher. Such a product is produced by the reaction of both of the chlorine atoms of each molecule of the phosphine reactant with the exception of the chain-terminating molecules of which only one chlorine atom undergoes reaction. Thus, while efficient polymeric organophosphorus stabilizers are obtained in accordance with this invention by employing the reactant in a phosphine to diol ratio of from about 0.1 mole to about 5 moles of the phosphine, and preferably from about 0.3 mole to about 2 moles of the phosphine per hydroxyl radical present in the diol reactant, proportions outside this range can also be employed, albeit the efficiency of the reaction may thereby be reduced. Similar considerations also hold true when other polyols are employed as a reactant instead of the diols used above for illustrative purposes.

Moreover, it is to be noted that in any given reaction between the phosphine and, for example, a saturated aliphatic diol, both the dimer and the higher molecular weight polymers described above may be obtained as products, and that each are highly effective as heat stabilizers for halogen-containing vinyl resin solutions. The dimer and the higher molecular weight polyols can, if desired, be mutually separated subsequent to their production by conventional techniques such as by the fractional distillation of the crude reaction product or by any other convenient method. However, their mutual separation is in no way essential to their use as stabilizers in accordance with this invention.

The saturated aliphatic polyols contemplated as reactants in accordance with this invention include the saturated aliphatic diols, such as ethylene glycol, propylene glycol, 1,2-butanediol, 1,4-butanediol, 1,5-pentanediol, 1,8-octanediol, and the like. Also contemplated by the expressions "saturated aliphatic polyols" and "saturated aliphatic diols" as employed herein and in the appended claims are the saturated aliphatic glycol-ethers, e.g., di-tri-, and polyoxyalkylene glycols such as diethylene glycol, triethylene glycol, dipropylene glycol, etc. In addition, stabilizers for halogen-containing vinyl resin solutions can also be obtained by the reaction of the phosphine with other polyols, such as the tri- and polyhydric saturated aliphatic alcohols, including 1,2,6-hexanetriol, pentaerythritol and the like. The polyols preferred as reactants are those containing from 4 to about 6 carbon atoms. It is also preferred that the hydroxyl radicals of the polyols be separated by at least 4 carbon atoms since the possible formation of cyclic products is thereby obviated.

In order to facilitate the removal of the hydrogen chloride formed during the course of the reaction from contact with both the reactants and the polymeric organophosphorus product, a compound with which hydrogen chloride will form a readily separable salt is also generally included in the reaction mixture in an amount sufficient to take up all of the hydrogen chloride produced. Organic tertiary amines, including aliphatic, aromatic and heterocyclic tertiary amines, are eminently suited for use in this respect. Illustrative of these are compounds such as triethylamine, tributylamine, tribenzylamine, pyridine, and the like. The preferred organic tertiary amines are those such as pyridine and triethylamine which are liquid under the reaction conditions employed, but which form solid, filterable salts with hydrogen chloride. Any other convenient method for removing the hydrogen chloride as it is formed, however, can also be employed.

In addition, the reaction is generally, although not necessarily, carried out in the presence of an inert hydrocarbon diluent such as benzene, toluene, diethyl ether, or the like. The use of such a diluent is particularly expedient when a bulky hydrochloride salt is formed during the course of the reaction.

The reaction is preferably allowed to proceed to completion as evidenced by a cessation in the formation of hydrogen chloride. Shorter reaction periods can also be employed, although ordinarily accompanied by reduced product yields. The crude reaction product is then filtered or otherwise treated to remove any hydrochloride salt present, and thereafter stripped to remove any unreacted materials as well as any diluent present. To this end, good results can be obtained, for example, by stripping the crude reaction product up to about the boiling point of the polyol reactant under substantially reduced pressure. The polymeric organophosphorus product thus obtained as a residue is subsequently utilizable as a stabilizer for halogen-containing vinyl resin solutions as herein described.

When incorporated in halogen-containing vinyl resin solutions, the polymeric organophosphorus compounds contemplated by this invention are effective in substantially preventing the discoloration of the resin solutions upon exposure to heat. In this manner, for example, the discoloration of fiber-spinning solutions can be minimized during spinning operations. In addition, synthetic fibers can be obtained from these solutions having a high degree of initial "whiteness," i.e., low color. Further, due to their higher molecular weight, as compared with conventional phosphorus-containing compounds, the polymeric organophosphorus compounds advantageously exhibit lower volatility and are often characterized by less odor. Moreover, the solubility of the polymeric organophosphorus compounds in conventional solvents such as acetonitrile, acetone, N,N-dimethylformamide etc. also facilitates the spinning operation and avoids the necessity of working with a two-phase spinning solution.

The polymeric organophosphorus compounds produced as herein described have been found effective as stabilizers when incorporated in halogen-containing vinyl resin solutions in small amounts effecting concentrations in the resin solutions of from about 0.01 percent to about 2 percent by weight of phosphorus based upon the weight of the resin. The concentration of stabilizer to be employed is therefore dependent upon the molecular weight of the particular compound utilized. Especially good results have been obtained in this connection by incorporating the polymeric organo-phosphorus compounds in the halogen-containing vinyl resin solutions in amounts effecting concentrations of from about 0.05 percent to about 1 percent by weight of phosphorus based upon the weight of resin. Little increase in the resistance of the resin compositions to discoloration by heat is realized by the use of stabilizer concentrations above this preferred range, although the use of such higher concentrations often permits the maintenance of a desirable degree of resistance to discloration for longer periods of time and may therefore be expedient where prolonged heating periods are involved. On the other hand, the stability of the resin compositions decreases proportionally with decreasing stabilizer concentrations below this range.

The method of incorporating the polymeric organophosphorus compounds in the halogen-containing vinyl resin solutions to be stabilized is not critical to this invention. Hence, any convenient method can be employed. For example, while the stabilizer is preferably added to the resin solvent prior to the addition of resin, the stabilizer can also be added to the solution during or following the dissolution of the resin in the solvent.

The utility and advantages of the stabilizers described herein as well as of the resin solutions stabilized therewith, will become further apparent from the following examples included to illustrate the practice of this invention.

EXAMPLE I

To a kettle equipped with a stirrer and thermometer, there were charged 125 grams of 1,5-pentanediol, (1.2 moles), 178 grams of pyridine and 200 cubic centimeters of benzene. The mixture was stirred and cooled to a temperature of 8° C. Thereupon, 179 grams of phenyldichlorophosphine (1.0 moles) were slowly added to the mixture in the kettle with continued stirring. An exothermic reaction ensued at a temperature maintained by continued cooling in the range of from 8° C. to 15° C. During the course of the reaction, a pyridine hydrochloride precipitate was formed. The reaction was continued for a period of about 2 hours, until the evolution of hydrogen chloride, as indicated by the formation of the pyridine hydrochloride precipitate, virtually ceased. An additional 375 cubic centimeters of benzene were then added to the crude reaction product, and the product filtered to remove the precipitate present. Thereafter, the filtered crude reaction product was vacuum-stripped up to a temperature of 152° C., under a reduced pressure of 3 millimeters of mercury. In this manner, 164 grams of a polymeric phenyldichlorophosphine-1,5-pentanediol reaction product were recovered as a light yellow liquid residue or distilland. Analysis showed the product to have a phosphorus content of 12.8 percent by weight and a viscosity of 3,200 centipoises at a temperature of 25° C. In similar manner, an effective stabilizer for halogen-containing vinyl resin solutions is produced by reacting phenyldichlorophosphine with 1,2,6-hexanetriol.

EXAMPLE II

In the manner and using equipment similar to that described in Example I, 268 grams of phenyldichlorophosphine (1.5 moles) and 156 grams of 1,5-pentanediol (1.5 moles) were reacted in initial admixture with 260 grams of pyridine and 300 cubic centimeters of benzene, at a temperature maintained in the range of from 10° C. to 21° C. During the course of the reaction, an additional 100 cubic centimeters of benzene were added to the reaction mixture. The reaction was continued until the evolution of hydrogen chloride, as indicated by the formation of a pyridine hydrochloride precipitate, virtually ceased. Thereafter, the crude reaction product was filtered and subsequently vacuum-stripped up to a temperature of 152° C., under a reduced pressure of 3 millimeters of mercury. In this manner, a polymeric phenyldichlorophosphine-1,5-pentanediol reaction product was recovered as a light yellow liquid residue or distilland. Analysis showed the product to have a phosphorus content of 14.1 percent by weight and a viscosity of 62,000 centipoises at a temperature of 25° C.

EXAMPLE III

In the manner and using equipment similar to that described in Example I, 537 grams of phenyldichlorophosphine (3 moles) and 312 grams of 1,5-pentanediol (3 moles) were reacted in initial admixture with 478 grams of pyridine and 750 cubic centimeters of benzene, at a temperature maintained in the range of from 9° C. to 36° C. The reaction was continued until the evolution of hydrogen chloride, as indicated by the formation of a pyridine hydrochloride precipitate, virtually ceased. Thereafter, the crude reaction product was filtered and subsequently vacuum-stripped up to a temperature of 150° C., under a reduced pressure of 4 millimeters of mercury. In this manner, 525 grams of a polymeric phenyldichlorophosphine-1,5-pentanediol reaction product were recovered as a light yellow liquid residue or distilland. Analysis showed the product to have a phosphorus content of 14.5 percent by weight, a refractive index ($n_D^{30}$) of 1.5629 and a viscosity of 77,000 centipoises at a temperature of 25° C.

EXAMPLE IV

In the manner and using equipment similar to that described in Example I, 98 grams of phenoxydichlorophosphine (0.5 mole) and 53 grams of diethylene glycol (0.5 mole) were reacted in initial admixture with 95 grams of pyridine and 250 cubic centimeters of benzene at a temperature maintained in the range of from 10° C. to about 20° C. The reaction was continued until the evolution of hydrogen chloride, as indicated by the formation of a pyridine hydrochloride precipitate, virtually ceased. Thereafter, the crude reaction product was filtered and subsequently vacuum-stripped up to a temperature of 100° C., under a reduced pressure of 5 millimeters of mercury. In this manner, 106 grams of a phenoxydichlorophosphine-diethylene glycol reaction product were recovered as a water-white liquid residue or distilland. Analysis showed the product to have a phosphorus content of 13.5 percent by weight and a viscosity of 31,000 centipoises at a temperature of 25° C. The product was insoluble in water, but soluble in acetonitrile and acetone.

In similar manner, an effective stabilizer for halogen-containing vinyl resin solutions is produced by reacting phenoxydichlorophosphine with 1,5-pentanediol.

EXAMPLE V

A series of experiments were conducted in the following manner to demonstrate the stabilizing action on halogen-containing vinyl resin solution of various polymeric organophosphorus compounds as provided for by this invention. In each experiment, 150 grams of acetone were introduced to a one-pint pressure bottle and cooled by placing the bottle in an acetone "Dry Ice" bath for about 30 minutes or until the temperature of the acetone reached approximately −20° C. One gram of the particular stabilizer utilized in each experiment was subsequently dissolved in the acetone, and to this cool solution, 50 grams of a copolymer of vinyl chloride (60 percent) and acrylonitrile (40 percent), having a molecular weight such that the specific viscosity of a 0.2 percent solution of the resin in cyclohexanone at a temperature of 20° C. was 0.261, were then added. The bottle containing the solvent, stabilizer and resin was capped, enclosed in a protective fabric bag and placed in a tumbling water bath at a temperature of 50° C. for about 30 minutes to effect solvation of the resin. Heating was continued for two hours at a temperature of 80° C. whereby a clear resin solution was obtained containing 25 percent solids and suitable for the spinning of synthetic fibers. The color of the resin solution was then determined quantitatively by measuring the transmission of light at a wave length of 430 millimicrons through an N,N-dimethylformamide solution containing 4 percent resin and 12 percent acetone by weight, and prepared by weighing out approximately 5 grams of the resin solution into a two-ounce glass vial and adding thereto a volume of N,N-dimethylformamide which in cubic centimeters was equal to 5.3 times the weight of the resin solution in grams.

The results obtained from these experiments are tabulated below in Table A. Included in the table for comparison are results obtained from similar experiments, in which, however, phosphorus-containing stabilizers other than those included within the scope of this invention, such as tri-(2-chloroethyl) phosphite, dibutyl phosphite, di-(2-ethylhexyl) phosphite, diphenyl phosphite, diisopropyl phosphite, 2-ethylhexyl octylphenyl phosphite, and triphenyl phosphite, were employed. Also included in the table are results obtained from control samples containing unstabilized resin solutions. One such control was prepared as described above but was not subjected to heat treatment. In the table, "color values" represent the percent transmission of light at a wave length of 430 millimicrons through the resin solution, with high "color values" being preferred. In all instances, the "color values" for the stabilized resin solutions were measured after heat treatment.

Table A

Stabilizer:                                    Color values

Controls—
- None (unheated resin solution) _____ 87
- None (heated resin solution) _____ 63

Polymeric organophosphorus compounds—
- Residue product of Example No. 1 _____ 84
- Residue product of Example No. 2 _____ 85
- Residue product of Example No. 3 _____ 85
- Residue product of Example No. 4 _____ 74

Other stabilizers:
- Tri-(2-chloroethyl) phosphite _____ 69
- Dibutyl phosphite _____ 67
- Di-(2-ethylhexyl) phosphite _____ 66
- Diphenyl phosphite _____ 65
- Diisopropyl phosphite _____ 66
- 2-ethylhexyl octylphenyl phosphite _____ 70
- Triphenyl phosphite _____ 69

From the above table the improved resistance to discoloration upon heating that is obtained by incorporating the stabilizers of this invention in a halogen-containing vinyl resin solution is readily apparent. In this connection, it is to be noted that those resin solutions having lower resistance to discoloration possess lower "color values," the latter signifying the transmission of less light through the solutions as a result of increased color development during heat treatment.

EXAMPLE VI

A series of experiments was conducted in a manner similar to that described in Example V, utilizing, however, various halogen-containing vinyl resins and solvents. The stabilizer employed in each experiment was the residue product of Example III. In runs numbered 1 and 2, the halogen-containing vinyl resin was a terpolymer of acrylonitrile (69 percent) vinyl chloride (20 percent) and vinylidene chloride (11 percent) having a molecular weight such that the specific viscosity of a 0.2 percent solution of the resin in diemthylformamide at a temperature of 29° C. was 0.334; in runs numbered 3 and 4, the resin employed was the same as that described in Example V; and in runs numbered 5 and 6, the resin employed was a copolymer of vinylidene chloride (46 percent) and acrylonitrile (54 percent) having a molecular weight such that the specific viscosity of a 0.2 percent solution of the resin in cyclohexanone at a temperature of 20° C. was 0.254. In runs numbered 1 and 5, the solvent employed was acetonitrile; in runs numbered 2, 4, and 6, the solvent employed was dimethylformamide and in runs numbered 3, the solvent employed was acetone. Moreover, in runs numbered 1 and 2, the solvation of the resin was conducted in a manner slightly different than that described in Example V in that the bottle containing the solvent, stabilizer and resin was heated at a temperature of 90° for a total period of 3 and ½ hours. In each experiment, the stabilizer, when employed, was incorporated in the halogen-containing vinyl resin solution in a concentration of a percent by weight based upon the weight of the resin. It is also to be noted that there are three experiments corresponding to each run number, indicated in the table by the letters A to C. Thus, experiments lettered A and B, for instance, were control experiments in which no stabilizer was employed, while the experiment lettered C was conducted with halogen-containing vinyl halide resin solutions which were stabilized in accordance with this invention using the residue product of Example III as a stabilizer. The results obtained from this series of experiments are tabulated below in Table B.

Table B

| Stabilizer | Color Values Run Nos. | | | | | |
|---|---|---|---|---|---|---|
| | 1 | 2 | 3 | 4 | 5 | 6 |
| (A) None (unheated resin solution) | 89 | 86 | 87 | 84 | 85 | 84 |
| (B) None (heated resin solution) | 82 | 62 | 63 | 68 | 77 | 60 |
| (C) Residue Product of Example IX | 83 | 78 | 78 | 81 | 86 | 81 |

EXAMPLE VII

A series of resin solutions were prepared in a manner similar to that described in Example VI. In runs numbered 1, the halogen-containing vinyl resin employed was a terpolymer of acrylonitrile (69 percent), vinyl chloride (20 percent) and vinylidene chloride (11 percent), having a molecular weight such that the specific viscosity of a 0.2 percent solution of the resin in N,N-dimethylformamide at a temperature of 29° C. was 0.334; in runs numbered 2, the resin employed was a copolymer of vinyl chloride (60 percent) and acrylonitrile (40 percent), having a molecular weight such that the specific viscosity of a 0.2 percent solution of the resin in cyclohexanone at a temperature of 20° C. was 0.261; the solvent employed was acetonitrile. From these resin solutions, filamentary yarns were produced by identical extrusion and coagulation procedures in accordance with conventional spinning techniques. The yarns thus produced were then tested for initial "whiteness" or color by measuring the percent reflectance from the yarns of filtered "blue" light using a Colormaster Differential Colormeter equipped with a tristimulus "Z" filter. The results obtained from this series of experiments are tabulated below in Table C. In the table, the reflectance values indicate the percent light reflectance from the yarn, with higher reflectance values denoting a higher degree of initial whiteness, i.e., less color, in the yarns being preferred.

Table C

| Stabilizer | Reflectance Values Run Nos. | |
|---|---|---|
| | 1 | 2 |
| (A) None | 63 | 66 |
| (B) Residue Product of Example I | 72 | |
| (C) Residue Product of Example II | 71 | |
| (D) Residue Product of Example III | | 81 |

From the above table, it can be seen that the yarn produced from the stabilized halogen-containing vinyl resin solutions of this invention is characterized by having a higher degree of initial whiteness, i.e., less color, than yarn produced from unstabilized resin solutions. This has also been found to be true in comparison with similar yarn produced from resin solutions containing conventional stabilizers such as dioctyltin maleate and the like.

The invention is susceptible of further modification within the scope of the appended claims.

What is claimed is:

1. A stabilized halogen-containing vinyl resin solution, comprising an organic solvent solution of a resin copolymer of acrylonitrile with at least one member selected from the group consisting of vinyl chloride and vinylidene chloride, said copolymer containing from about 15 percent to about 70 percent by weight of the chlorine-containing monomer, and a stabilizing amount of the polymeric organophosphorus product produced by the reaction of (a) a saturated aliphatic polyol containing from 4 to 8 carbon atoms, selected from the group consisting of the mono-, di-, and trialkylene glycols in which the hydroxyl radicals are separated by at least 4 carbon atoms, with (b) an aromatic dichlorophosphine represented by the general formula:

wherein R designates a member selected from the group consisting of the phenyl and phenoxy radicals, at a temperature of from about −10° C. to about 100° C., in a proportion of from about 0.1 mole to about 5 moles of said aromatic dichlorophosphine per hydroxyl radical present in said saturated aliphatic polyol; the amount of said polymeric organophosphorus product being sufficient to stabilize said vinyl resin solution to discoloration upon exposure to heat.

2. A stabilized vinyl resin solution, comprising an organic solvent solution of a resin copolymer of acrylonitrile with at least one member selected from the group consisting of vinyl chloride and vinylidene chloride said copolymer containing from about 15 percent to about 70 percent by weight of the chlorine-containing monomer, and a stabilizing amount of the polymeric organophosphorus product produced by the reaction of an alkylene glycol containing from 4 to 8 carbon atoms, in which the hydroxyl radicals are separated by at least 4 carbon atoms, with an aromatic dichlorophosphine represented by the general formula:

wherein R designates a member selected from the group consisting of the phenyl and phenoxy radicals at a temperature of from about 0° C. to about 50° C. in a proportion of from about 0.3 mole to about 2 moles of said aromatic dichlorophosphine per hydroxyl radical present in said alkylene glycol; the amount of said polymeric organophosphorus product being sufficient to stabilize said vinyl resin solution to discoloration upon exposure to heat.

3. The stabilized halogen-containing vinyl resin solution according to claim 2 wherein the aromatic dichlorophosphine employed in producing the polymeric organophosphorus product is phenyldichlorophosphine.

4. The stabilized halogen-containing vinyl resin solution according to claim 2 wherein the aromatic dichlorophosphine employed in producing the polymeric organophosphorus product is phenoxydichlorophosphine.

5. The stabilized halogen-containing vinyl resin solution according to claim 2 wherein the glycol employed in producing the polymeric organophosphorus product is 1,5-pentanediol.

6. The stabilized halogen-containing vinyl resin solution according to claim 2 wherein the polymeric organophosphorus product is incorporated in the resin solution in a concentration effecting the presence of from about 0.01 percent to about 2 percent by weight of phosphorus based upon the weight of the resin.

References Cited in the file of this patent

UNITED STATES PATENTS

| | | |
|---|---|---|
| 2,646,417 | Jennings | July 21, 1953 |
| 2,817,650 | Duke | Dec. 24, 1957 |
| 2,834,798 | Heckenbleiker et al. | May 13, 1958 |
| 2,839,563 | Heckenbleiker et al. | June 17, 1958 |
| 3,029,214 | Hobson | Apr. 10, 1962 |